3,560,470
CRYSTALLINE POLYMER NUCLEATION
Harold V. Wood and William O. Drake, Bartlesville, Okla., assignors to Phillips Petroleum Company, a corporation of Delaware
No Drawing. Filed Dec. 22, 1967, Ser. No. 692,659
Int. Cl. C08f 29/02
U.S. Cl. 260—93.7
1 Claim

ABSTRACT OF THE DISCLOSURE

Crystalline polymer compositions are improved with respect to physical properties by the inclusion therein of a nucleating amount of 5-benzylidene-2-thiohydantoin.

BACKGROUND OF THE INVENTION

The crystal structure of solid polymers as well as the general characteristics of polymer molecule interaction are known to greatly influence the physical properties of such polymers in the solid state. Several properties which are known to be related to crystal structure are, for example, tensile strength, modulus, melting point, freezing point, clarity, refraction, and others. These influences are apparent in polymers having any substantial degree of crystalline structure of which many are known. As a general rule, however, the prominent effects of crystalline spherulites on the characteristics of solid polymers are more pronounced where a greater portion of the polymer molecules are confined in a crystal matrix as opposed to the random molecule entanglement generally associated with amorphous polymer structure. For example, solid polypropylene is a thermoplastic polymer which has achieved great commercial importance in numerous applications. By use of appropriate conditions and catalysts, is can be produced in a sterically regulated form known as crystalline polypropylene. It is possible to produce with commercially practical catalysts polymers which have a high proportion of segments that are completely crystalline. A property which is associated with crystallinity of polypropylene is the capacity of a melt thereof to solidify in crystalline form.

Following conventional terminology, reference to highly "crystalline" polymers means, unless the context indicates otherwise, solid polymers having a high degree of crystallinity, at least 50% as determined by X-ray analysis or comparable methods. In general, polypropylene having a crystallinity of this order contains at most only a very small proportion of material which is extractable in non-aromatic hydrocarbon such as gasoline boiling range hydrocarbons. Typically, the proportion of highly crystalline polypropylene which is extractable in boiling heptane or isooctane is less than 10% and usually less than 5%. Similarly, "crystallizable" polymers are those which have a molecular arrangement that enables them to solidify from a melt in a highly crystalline structure. The general practice in the art is to refer to "crystalline" or "crystallizable" polymer, rather than "partially crystalline" or "paritlly crystallizable" polymer. For example, a crystallinty of 70% is relatively high for polypropylene. Normally solid, crystalline polypropylene usually has a viscosity average molecular weight of at least about 40,000 and generally between 100,000 and 2,000,000. For convenience, the molecular weight is usually expressed in terms of intrinsic viscosity. The intrinsic viscosity of polypropylene measured in decalin at 150° C. is generally between 1.0 and 6 dl./g. but may be as low as 0.5 or less and as high as 15 or more.

Reference to "polymers" herein includes both homopolymers and copolymers unless the context indicates otherwise.

Crystalline polymers, in their usual form, have some outstandingly good properties and some undesirable ones. For example, desirable properties of highly crystalline polypropylene are high tensile strength and substantial hardness. One disadvantage of the usual forms of highly crystalline polypropylene is a lack of transparency or clarity, which shows up as haze in thin films and as translucency, decreasing to ultimate opacity, in articles of progressively increased thickness. Another disadvantage of the usual forms of highly crystalline polypropylene is a relatively low impact resistance. This handicaps the use of crystalline polypropylene for making vessels or containers which during use may be subject to mechanical shock. All of these characteristics are known to be governed at least in part by the degree of crystallinity and crystallite size.

Polypropylene, like many other crystalline polymers, crystallizes from a melt in a form in which the individual crystals are associated in spheroid or ellipsoid bodies known as spherulites. Generally, clarity and some mechanical properties of articles made from polypropylene are better when the spherulites are relatively small. In addition, polymer freezing point is known to be indicative of spherulite size as smaller spherulites result in higher freezing points, all other parameters being constant.

It has now been found that 5-benzylidene-2-thiohydantoin can be used as a polymer additive to modify the crystallization process and thereby provide substantial improvements in physical properties of solid polymers and in mechanical properties of articles produced therefrom, especially those properties which are related to crystallite and spherulite structure of the polymers. This additive is particularly effective in improving the physical properties of crystallizable polymers and copolymers of 1-olefins having from 2 to about 8 carbon atoms.

The improvements of this invention are obtained when the additive is present in dissolved or thoroughly dispersed form in the polymer melt prior to the final crystallization thereof by cooling.

It is, therefore, one object of this invention to provide improved polymer compositions. It is another object of this invention to improve the characteristics of solid crystalline polymers. It is another object of this invention to provide new and useful crystalline polymer compositions. It is yet another object of this invention to provide polymeric compositions having improved physical properties. It is yet another object of this invention to provide formed polymeric articles having improved appearance and physical properties. It is another object of this invention to provide polymeric compositions having improved processing characteristics. It is another object of this invention to provide a method for improving polymer compositions. It is another object of this invention to provide a method for improving the physical properties of formed polymeric articles. It is yet another object of this invention to provide an improved method for processing polymers.

Other objects and advantages of this invention will be apparent to one skilled in the art in view of this disclosure and the claims appended hereto.

In accordance with one embodiment of this invention, crystallizable polymer compositions comprise at least 1 crystallizable polymer of at least one 1-olefin monomer having from 2 to about 8 carbon atoms and a nucleating amount of 5-benzylidene-2-thiohydantoin.

In accordance with another embodiment of this invention the processing characteristics and physical properties of articles formed from crystallizable polymers are improved by incorporating in said polymers a nucleating amount of 5-benzylidene-2-thiohydantoin.

In another aspect, this invention comprises improved articles of solid crystalline polypropylene or other similar solid crystalline polymers, prepared by crystallizing a melt of crystallizable normaly solid polypropylene or other similar polymer, containing a nucleating amount of 5-benzylidene-2-thiohydantoin.

DESCRIPTION OF PREFFERED EMBODIMENTS

Several properties of the articles produced from normally solid crystalline polymers according to this invention are improved thereby. The improvement will vary, depending on the particular polymer used, other additives used therewith, and the conditions under which the final solidification of the melt takes place.

Generally, it is found that the spherulite dimensions in the crystallized articles produced according to this invention are substantially smaller than they would be in an article produced in identical manner from the same polymer but without employing a nucleating amount of the additive. These results are illustrated by freezing point elevation resulting from the incorporation of this additive in the polymer compositions.

It is also generally found that the clarity of film or of thicker shaped articles produced from compositions according to this invention is substantially improved, compared to that of articles produced in identical manner from the same polymer without said additive, particularly when the final ccoling step is under non-flow conditions.

The modulus of elasticity of polymer produced according to this invention generally is increased over that of the identical polyer crystallized in identical manner which does not contain at least a nucleating amount of 5-benzylidene-2-thiohydantoin. Similarly, tensile strength and other tensile properties are improved.

One of the advantages of this invention is that injection molding of the polypropylene compositions of this invention can be successfully carried out over a much wider range of temperature and pressure conditions than in the absence of crystallization modifying compounds. The area of a "molding diagram" for modified polymers, i.e., the area on the plot of cylinder temperature vs. ram pressure which covers satisfactory conditions, is greater than that obtained with unmodified polymer.

Another advantage is that the mixtures according to this invention can solidify at a higher temperature than those of identical polymers not containing ths additive. Hence, processing can generally be carried out in a shorter period of time. Another advantage of this invention is that it is possible to apply the process to highly crystalline polymers which have a relatively low melt index, allowing their being processed at lower temperature.

It is further often found that impact resistance is greater in articles produced according to this invention than in those identically produced from identical polymer without this additive, particularly when the final cooling step is under non-flow conditions.

The additive is effective in low concentrations and is preferably used in such low concentrations. Suitable concentrations are in the range from 0.001 or less to 5 parts by weight per 100 parts by weight of polymer (php.). A suitable lower concentration limit is about 0.01 php. Concentrations in the range from 0.05 to 2 php. are generally preferred. Although higher concentrations may be used, no further benefit of the kind described is generally obtained thereby.

If desired, other additives may be present in the olefin polymer. Crystallization modifying additives of other types may be added. Other additives, which are conventionally added, include antioxidants, stabilizers against ultraviolet radiation, and the like. They may be added at any convenient stage of processing.

The present invention is advantageous when used with clear, unpigmented, unfilled polymers. However, the additive of this invention is also compatible with conventional fillers and pigments.

The invention is applicable to solid polymers selected from homopolymers of aliphatic 1-olefins having 2 to 8 carbon atoms per molecule such as ethylene, propylene, butene-1, pentene-1, 4-methylpentene-1, hexene-1, heptene-1, octene-1, and the like, and copolymers of two or more of said 1-olefins, such as copolymers of ethylene and propylene, ethylene and butene-1, propylene-butene-1, ethylene and hexene-1, propylene and octene-1, ethylene and 4-methylpentene-1, ethylene and octene-1, hexene-1 and octene-1 and the like. The term "polymer of ethylene," for example, as used herein, is intended to include polymers obtained by polymerizing ethylene alone and by polymerizing mixtures of ethylene and minor amounts of other monoolefins containing from 3 to 8 carbon atoms per molecule. Particular polymers which can be improved with respect to physical and optical properties according to the invention include polyethylene, polypropylene, ethylene-propylene copolmers, ethylene-butene-1 copolymers, propylene-butene-1 copolymers, ethylene-hexene-1 copolymers, and the like. Conventional polyethylenes, such as low density polyethylenes produced by high pressure processes, can be used in preparing the novel composition of this invention. High density solid homopolymers and copolymers of 1-olefins produced in accordance with the process described by Hogan and Banks in U.S. Pat. 2,825,721, issued Mar. 4, 1958, can also be advantageously utilized, and are generally preferred because of their outstanding properties. These latter polymers often have an inherent viscosity of at least 0.8, preferably an inherent viscosity between 1.2 and about 10, as determined for a solution of 0.2 gram of polymer in 50 cc. of tetralin at 130° C. Certain of these polymers also have a density of at least 0.94, preferably at least 0.95 at 25° C., and a crystallinity of at least 70 percent, preferably at least 80 percent, and more desirably at least 90 percent, at 25° C. The crystallinity of the polymers can be determined by measurements of nuclear magnetic resonance [Wilson and Pake, Journal of Polymer Science, 10, 503 (1953)], using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by a fall ofabout 1.5° C. per minute at 135° C. The crystallinity can also be determined according to the method of Matthews, Peiser and Richards, Acta Crystallographica, 2, 85 (1949). The softening point of the polymer will vary with the particular polymer used increasing as the density and the crystallinity of the polymer increases. Generally, the softening point of the high density solid polymer is above about 250° F., preferably in the approximate range of 250 to 300° F., and is several degrees higher, e.g., about 10° F., than the melting point of the polymer.

These polymers can also be produced by polymerizing propylene or other suitable olefins by contact with a highly sterospecific catalyst system. A great variety of stereospecific catalysts have been described in the literature, and are usually the reaction products of halides, in order of preference chlorides and bromides, of transition metals from subgroups $b$ of Groups 4 and 5 of the Periodic Chart of Elements, i.e., of Ti, Zr, Hf, V, Nb, or Ta, with organometallic reducing agents in which the metal is from Group 1, 2 or 3. Preferred reducing agents are organoaluminum compounds and particularly aluminum alkyls, including aluminum alkyl halides. The most effective catalysts for the production of crystalline polypropylene known to date are those prepared from certain forms of titanium trichloride and certain aluminum alkyls and aluminum alkyl halides.

In the production of crystallizable alpha-olefin polymers, the reaction mixture formed in the low pressure polymerization is treated to deactivate the catalyst, usually by contact with a polar compound such as an alcohol and/or hydrochloric acid, and is subsequently washed for removal of at least a substantial portion of the catalyst residue.

Various methods may be employed for introducing the additive of this invention into the polymer. It is generally preferred to add the additive after the polymerization reaction has been completed, the active catalyst has been killed and the predominant part of the catalyst residue washed out of the polymer. The additive may, for example, be added to the washed polymerization slurry or cement; the mixture is then dried and a dry mixture of additive and polymer is recovered. Alternatively, additives may be added to the dry polymer either when the polymer is in the form of a powder fluff or in the form of shaped pellets or the like. Another method of mixing the additive with the crystalline polymers is that in which the 5-benzylidene-2-thiohydantoin is dissolved in a solvent such as acetone or methyl alcohol, and the resulting solution sprayed on or mixed with finely-divided polymer. It is also possible to add the additive to the crystallizable polymer after it has been melted.

It is essential for effective results that a substantially homogeneous distribution of the additive in the molten polymer be obtained prior to the final crystallization of the polymer. To promote mixing of the polymer and the additive, it is best to apply mechanical mixing at temperatures at which the polymer has a relatively low viscosity, i.e., a temperature exceeding the melting temperature of the polymer by from 20° to 150° C. These conditions are particularly important when products of greatly enhanced transparency are desired.

The additive may be present in the polymer melt in true solution or in uniform dispersion, e.g., as a colloidal suspension of a solid having a diameter of from 0.001 to 1 micron.

The final cooling step in the production of a shaped article determines those of its effective properties which depend on crystal structure. Whereas in the absence of crystallization modifying additives slow cooling leads to formation of excessively large spherulites, and rapid cooling tends to lead to incompletely crystallized polymer, i.e., polymer having a lower degree of crystallinity than it is capable of acheving, the use of additives of this invention generally results in a polymer having a high degree of crystallinity and a fine spherulite structure regardless of whether the cooling is carried out very rapidly or over a relatively longer period of time. Rapid cooling can be carried out as quickly as heat conduction permits. This is, of course, a function of the geometry and heat removal capacity of each system. It can be completed in seconds in the production of film. Slow cooling may be carried out over a period from several minutes to several hours.

Cooling of the polymer mixture can take place in any suitable apparatus. Cooling is usually carried out in conventional apparatus associated with the production of shaped articles from olefin polymers.

The manner in which mixing takes place provides a uniform distribution of the crystallization promoting additive in the polymer. This uniform distribution remains substantially unaffected during the crystallization, both when crystallization progresses very rapidly and when there is a considerable temperature gradient, as in the cooling of large objects.

Shaped articles from product according to this invention may be, for example, bars, sheets, films, tapes, granules, rods or flakes, molded or extruded large or small shapes of filament. Shaped articles according to this invention may be manufactured from the mixtures according to this invention by casting, compression molding or injection molding; films may be obtained by blowing or by slit extrusion; filaments, bars, tapes and the like may be obtained by extrusion. If desired, these can be reduced, by chopping, to the form of granules, chips or the like. Filaments can be stretched to obtain further improvement of properties. Other known methods of forming shaped polyolefin aticles are equally adapted to use with mixtures according to this invention.

The invention will be further describey by reference to the following example, which is not to be interpreted as limiting the invention but is merely intended to be illustrative of the invention.

EXAMPLE I

Polypropylene having a melt flow of about 4 dg./min. (ASTM D1238–62T condition L) and a density of 0.905 g./cc. (ASTM D1505–63T) was prepared using a $TiCl_3.1./s.$ $AlCl_3$+diethylaluminum chloride catalyst. It was mixed with 0.2 php. of the additive of the invention in a Brabender plastograph for 5 minutes at 190° C. and 75 r.p.m. under a nitrogen atmosphere. Properties of the parent polymer and of the blend, both of which contained 0.05 php. or 2,6-di-tert-butyl-4-methylphenyl, 0.05 php. of tetrakis [3-(3,5-di-tert - butyl - 4 - hydroxyphenyl-propionyloxymethyl]methane, and 0.15 php. of dilauryl-thiodipropionate, are:

| Additive | Amount used, php. | Flexural modulus [a] | Freezing point,° C.[b] |
|---|---|---|---|
| 5-benzylidene-2-thiohydantoin | 0.2 | 247,000 | 119 |
| None | | 209,000 | 109 |

[a] P.s.i. at 73° F., ASTM D790–63.
[b] By differential thermal analysis.

EXAMPLE II

A different sample of polypropylene having the same melt flow and density as the material used in Example I and containing the same amounts of the same stabilizers was mixed with varying amounts of the additive of the invention in the same manner as in Example I. Properties of the parent polymer and of the blends are:

| Additive amount, php. | Flexural modulus | Freezing point,° C. |
|---|---|---|
| 0.002 | 218,000 | 119 |
| 0.02 | 222,000 | 123 |
| 0.05 | 251,000 | 127 |
| 0.1 | 239,000 | 126 |
| 0.2 | 236,000 | 126 |
| 0.5 | | 123 |
| 1.0 | 219,000 | 130 |
| None | 222,000 | 116 |

The increased freezing points obtained by addition of the nucleating agent of the invention are indictive of alterations in the kind and extent of crystal structure obtained over a wide range of additive concentrations. Modulus values are also altered by the presence of this additive, and show a significant increase at additive concentrations within the range of from about 0.05 to about 0.2 php. This additional advantage is evident at additive concentrations of from about 0.02 to about 0.3 php.

We claim:
1. A polymer composition comprising crystallizable polypropylene and a nucleating amount of 5-benzylidene-2-thiohydantoin within the range of from 0.02 to 2.0 parts by weight of said 5-benzylidene-2-thiohydantoin per 100 parts by weight of said polypropylene.

References Cited

UNITED STATES PATENTS 3,367,926   2/1968   Voecks _____ 260—93.5

OTHER REFERENCES

Chem. Abstracts, 57, 13980(i) and 1216 S, Col 2.

JOSEPH L. SCHOFOR, Primary Examiner

S. M. LEVIN, Assistant Examiner

U.S. Cl. X.R.

260—88.2, 94.9